United States Patent [19]

Dunbar

[11] Patent Number: 5,231,781
[45] Date of Patent: Aug. 3, 1993

[54] ILLUMINATED FLOAT

[75] Inventor: Bret A. Dunbar, 17662 S. W. Middlesex Way, Beaverton, Oreg. 97006

[73] Assignee: Bret Allen Dunbar, Beaverton, Oreg.

[21] Appl. No.: 777,575

[22] Filed: Oct. 16, 1991

[51] Int. Cl.⁵ .............................................. A01K 93/02
[52] U.S. Cl. .................................... 43/17.5; 43/43.1;
136/291; 362/183; 441/16
[58] Field of Search ........................ 136/291; 362/183;
43/17.5, 43.1; 441/16

[56] References Cited
U.S. PATENT DOCUMENTS
4,809,458  3/1989  Tanikuro et al. ................... 43/17.5

Primary Examiner—Aaron Weisstuch

[57] ABSTRACT

An illuminated float comprises a plurality of solar generators, a storage battery for storing therein the electrical energy generated by the solar generator, a light-emitting element which emits the light by the energy supplied from the storage battery, a homing device which emits a high-frequency beacon displayed on the ships display screen, and an energy control means which permits the supply of electrical energy from the storage battery to the light-emitting element and the homing device only when ambient illumination drops below a predetermined level.

12 Claims, 3 Drawing Sheets

ILLUMINATED FLOAT

FIELD OF THE INVENTION

The present invention relates to illuminated floats used with fishing equipment, for marking underwater hazards, as location devices, as safety devices, for preventing and marking the paths of oil spills, for aesthetic uses, and for any other feasible use in the marine or any other conceivable environment.

BACKGROUND OF THE INVENTION

In the example of illuminated floats being used with fishing nets, such as purse seines, towing nets, stationary nets, gill nets, longlines, nets used to define fish preserve or culture and so on. In general, floats are fastened to predetermined positions of the fishing nets in order to identify the positions of the fishing nets and to maintain the fishing nets in water in a desired shape.

In order to enable the visual perception of such floats at night, reflecting elements are attached to the surfaces of the floats or storage type fluorescent materials are coated over the surfaces of the floats.

However, the floats with reflecting elements attached to the surfaces thereof have the following problems.

That is, the reflecting elements are only bonded to the surfaces of the floats. They tend to be easily separated from the floats when the floats are thrown into the water and when they collide against the hull of the ship vessels as they are retrieved on the ships or against drifts. They are also separated due to friction. Furthermore, in order to visually perceive such floats, light sources must be provided in order to emit the light rays which in turn are reflected by the reflecting elements. In addition, the visual perception distance is limited by the capacity or intensity of the light sources. In addition, when the floats move or the ships pitch, roll and rock, it becomes difficult to correctly strike the light rays against the reflecting elements so that it becomes very difficult to find the floats with the reflecting elements.

Meanwhile, the storage-fluorescent material coated floats also have some problems as described below.

That is, since the fluorescent materials are only coated over the surfaces of the floats, they also tend to be separated as in the case of the floats with the reflecting elements. Furthermore, in order to store the energy into the fluorescent materials, the light sources are also needed. The storage batteries used were not efficient enough to store the proper amount of electrical energy needed to energize the light-emitting element. In addition, their light-emission time is short, and the maximum luminance from the light-emitting element is so low, the distance at which floats can be perceived is extremely limited. Moreover, their luminance decreases as time elapses so that it becomes difficult to see them. The luminance of a fluorescent material is in a general in proportion to the intensity of light emitted from a light source so that when the light rays are emitted from a distance spaced by some distance from a float in order to make the luminance of the floats perceivable, a light source having a relatively high light-emitting capacity is needed. As a result, the cost is increased and a light source used in increased in size and weight so that relatively large space for installation of a light source must be provided on ship.

BRIEF SUMMARY OF THE INVENTION

In view of the above, the objects of the present invention are to provide an illuminated float which can substantially solve the above described technical problems in a reasonable fashion and which automatically emits light and, or a homing signal when the ambient or natural illumination drops below a certain level at night or at any other dark time.

Another object of the present invention is to provide an illuminated float which can be perceived at a high degree of probability under any conditions such as fishing conditions, adverse weather conditions and so on.

A further object of the present invention is to provide an illuminated float which can eliminate the need for a light source enabling the float to be perceived so that energy saving can be attained and also human energy can be reduced in the case of finding the floats. Furthermore, this object will allow the fishing gear to be less prone to be damaged.

In order to attain the above and other objects of the present invention, an illuminated float comprises a float main body, a removable solar insert, a plurality of solar generators within said solar insert, a storage battery, within said solar insert for storing therein electrical energy generated by the solar generator, a light-emitting element which emits the light from the energy supplied from the storage battery, and an energy control means which permits the supply of electrical energy from the storage battery to the light emitting element and the homing device only when the illumination level drops below a predetermined level.

When the surrounding illumination drops below a predetermined level, the energy control means electrically energizes both the homing device and the light-emitting element so that the electrical energy which is generated by the solar module and is stored in the storage battery is supplied to the homing device and the light-emitting element so that the latter emits the light.

As described above, the illuminated float in accordance with the present invention emits the light when the surrounding illumination drops below a predetermined level so that it can be perceived under any operating conditions with a high degree of probability. The illuminated float in accordance with the present invention eliminates the use of a light source for discriminating the floats so that the illuminated floats which move relative to a ship can be easily perceived. As a result, energy and labor savings, as well as the objects of less damaged gear and a more ecologically sound environment can be attained.

DETAILED DESCRIPTION OF THE EMBODIMENT

The preferred embodiment of the present invention will be described in detail with reference to FIGS. 1-5.

Figure 1:
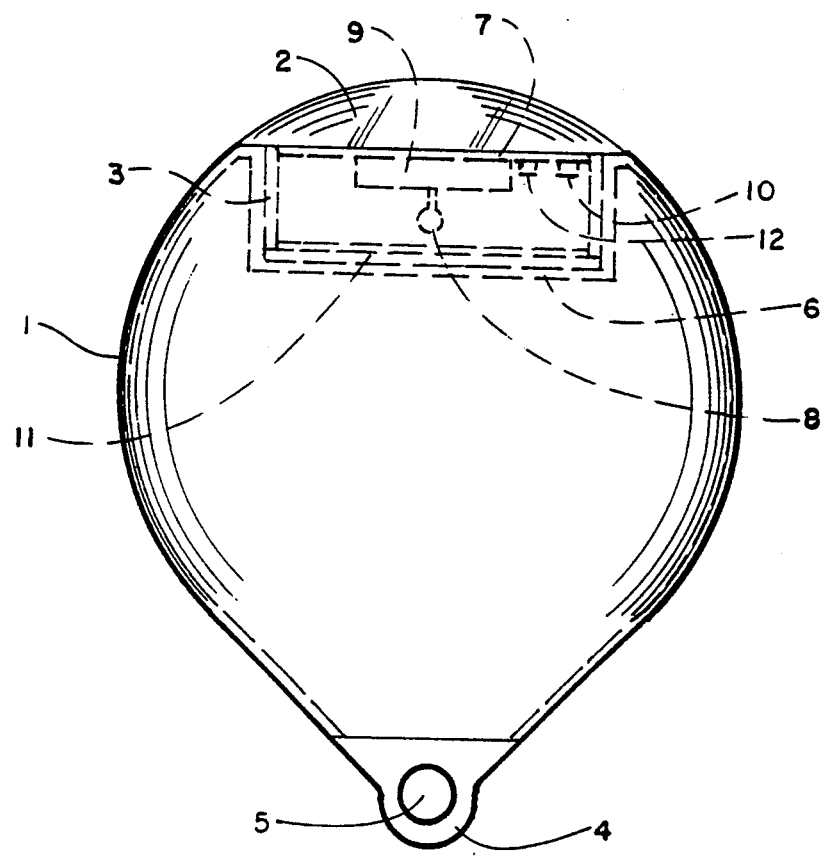
FIG. 1 is a front view of an illuminated float in accordance with the present invention.

In FIG. 1, reference numeral 1 denotes a hollow buoyant float main body consisting of a whole buoyant portion and a solar insert 3 and a solar housing 6 therein enclosed. The solar insert 3 and the solar housing 6 are integrally formed from a variety of synthetic resins such as poly-carbonates, high-density plastic compounds, and even poly-vinyl chlorides. The insert lens 11, made from the same variety of synthetic resins as described above, couples to the solar insert 3 and allows light from the light-emitting element to radiate outward through the float main body. The insert lens also allows simple access to the components within the solar insert 3 and insures a reusable water-proof seal. The convex shape of the solar lens 2 allows the light to be concentrated on the solar modules 7 during charging thereby allowing for a greater charge of the storage battery 9, even if the light source is not directly in line with the solar lens 2 as best shown in FIG. 1. Projection 4 which has a fastening hole 5 for fastening the float main body 1 to a fishing net or the like is extended from the upper portion of float main body 1. The solar insert 3 and the solar housing 6 are formed from a transparent synthetic resin so that the solar light can be transmitted through the solar lens 2 into the interior of the solar insert 3. A plurality of solar generators 7 are located within the solar insert 3 and are clamped securely between the storage battery 9 and the solar lens 2. A light-emitting element 8 such as a krypton bulb is located in the center of the solar insert 3 and between the insert lens 11 and the storage battery 9. Therefore, as shown in FIG. 1, the solar energy is transmitted through the transparent solar lens 2 to fall on the solar generators 7 and the light emission of the light-emitting element 8 can be perceived from the exterior of the float main body 1. A storage battery 9 for storing therein the electrical energy generated from the solar modules 7 is disposed between the light-emitting element 8 and the solar modules 7 as best shown in FIG. 1. In the first embodiment, the storage battery 9 comprises a small-sized nickel-cadmium storage battery. The electric power generation capacity of the solar modules 7 and the quantity of the electric energy stored in the storage battery 9 and are so determined that they are in excess of the consumption of the energy by the light-emitting element 8 during one night. Disposed in the solar insert 3 is an energy control unit 10 which permits the supply of electrical energy from the storage battery 9 to respective light-emitting elements 8 only when the illumination outside of the float main body 1 drops below a predetermined level at night or at any other time. The energy control unit 10 can be designed and constructed from various electrical component parts such as a light sensor, a switching element and so on. The electrical components needed could consist of low voltage photocells, light-sensitive semi-conductors and so on. As a whole, the illuminated float in accordance with the present invention is so designed and constructed to have a sufficient degree of buoyancy.

The mode of operation of the first embodiment with the above-described construction will be explained below.

For example, a large number of illuminated floats in accordance with the present invention are fastened to a gill net, a purse seine, a towing net, or are used for marking underwater hazards or as location devices for navigational purposes by fastening the projection 4 of each illuminated float main body 1 to the fishing gear or objects to be identified with fine strings.

In each illuminated float thus fastened, each solar generator 7 receives solar energy transmitted through the convex shaped solar lens 2 during the day time and converts it into the electrical energy which in turn is stored in the storage battery 9. When illumination outside of each illuminated float main body 1 drops below a predetermined level of ambient light, such as dusk or at any other dark time, the energy control unit 10 permits the supply of electrical energy to the respective light-emitting element 8 so that the latter will emit the light through the float main body 1 to the outside. The energy control unit 10 will also automatically terminate the supply of electrical energy from the storage battery 9 to the light-emitting element 8 and the homing device 12 when the illumination outside of the float rises above the predetermined level.

Therefore, when the illuminated floats fastened to a gill net or longline are thrown into the water in such a way that the majority of the float main body 1 is exposed above the water surface, the light-emitting element 8 automatically emits the light at night by converting the electrical energy stored during the day time in the manner described above so that the position and shape of fishing gear and the location of navigational and hazard markers are easily perceived at night or any dark time.

When illuminated floats are fastened to various fishing gear, the positions of the gear can be detected by seeking the exterior of a float which emits the light at night when the gear is drawn so that the gear can be safely and rapidly found and drawn onto the deck of the ship.

Furthermore, when the illuminated floats are fastened to a stationary fishing net, a net extended for fish culture or a raft for sea weed or pearl culture in such a way that the float main body 1 is exposed above the water's surface, the solar modules 7 receive the solar energy and convert it into electrical energy which in turn is stored in the storage battery 9 during the daytime. When the sun falls, the energy control unit 10 is actuated so that the light-emitting element 8 automatically emits the light. Because of the light rays emitted from the light-emitting element 8, the position, extension and shape of the fishing gear can be perceived from the deck of the ship so that the collision of the ship with the fishing tackle and the crossing of the fishing tackle by the fishing boat can be prevented. As a result, damages to the fishing gear and ship can be prevented.

Furthermore, the illuminated floats fastened to the floating lines of a fishing net automatically emit light at night so that the emitted light serves to collect and guide fish.

In the first embodiment, the electrical energy stored in the storage battery 9 is sufficient to cause the light-emitting element 8 to emit light during the whole night and the intensity of light emitted from each illuminated float is sufficiently high so as to permit the easy detection of the floats. As a result, unlike the prior art fishing operations, the external light source for visually detecting the floats at night can be eliminated, whereby energy savings can be attained.

The illuminated float of the first embodiment of the present invention is in the form of an integral ball so that it is unlikely that it will tangle with the fishing net or get caught in a position where the solar insert 3 is facing downward, toward the water. Furthermore, it can be easily handled. In addition, the solar generators 7, the light-emitting element 8, the storage battery 9, the energy control unit 10, and the homing device 12 are housed within the strong or rugged float main body 1 so that even when the fishing boat strikes the float main body 1, the component parts housed in it are prevented from being damaged. During the day-time, the solar energy is being converted into electrical energy and stored and during the night or dark time the light-emitting element 8 continues to emit light. Furthermore, the illuminated float in accordance with the present invention has a high degree of durability so that it can be used for a long period of time.

Figure 2:
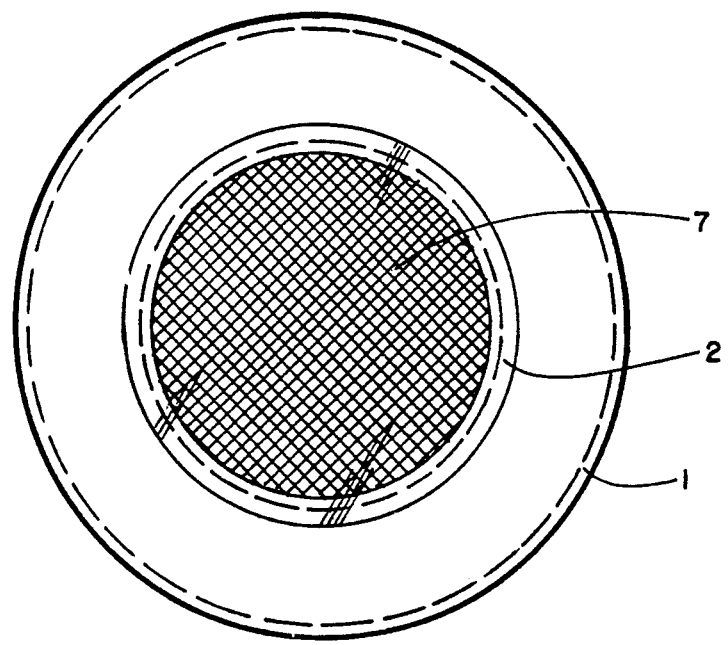
FIG. 2 is a top view thereof.
Figure 3:
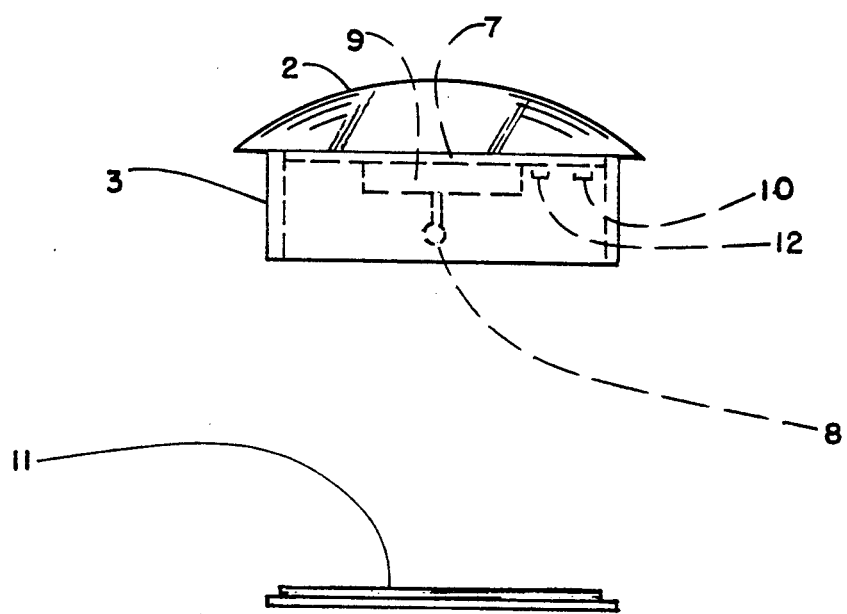
FIG. 3 is an exploded view thereof.
Figure 3:
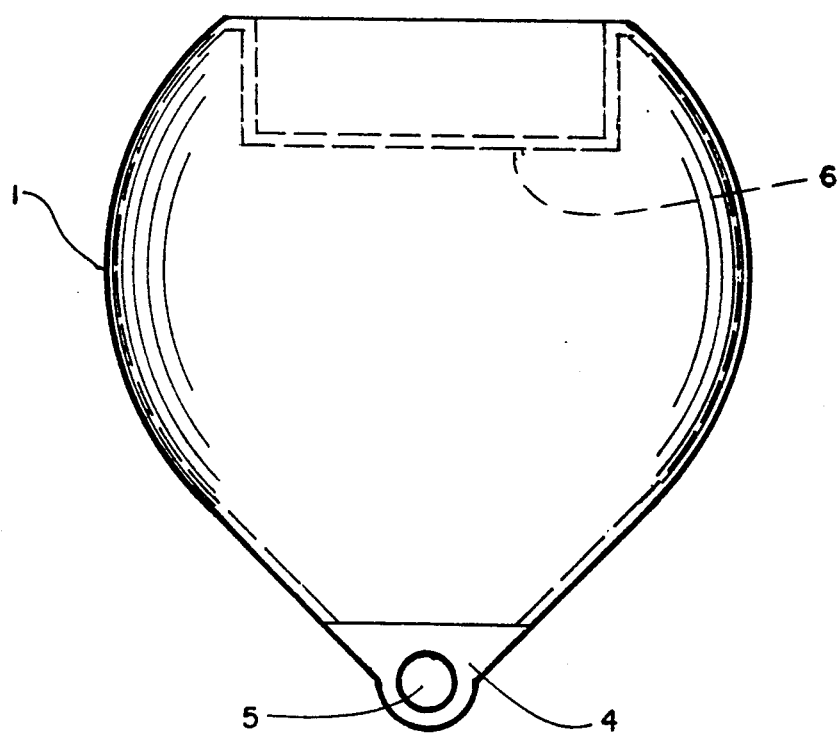
Figure 4:
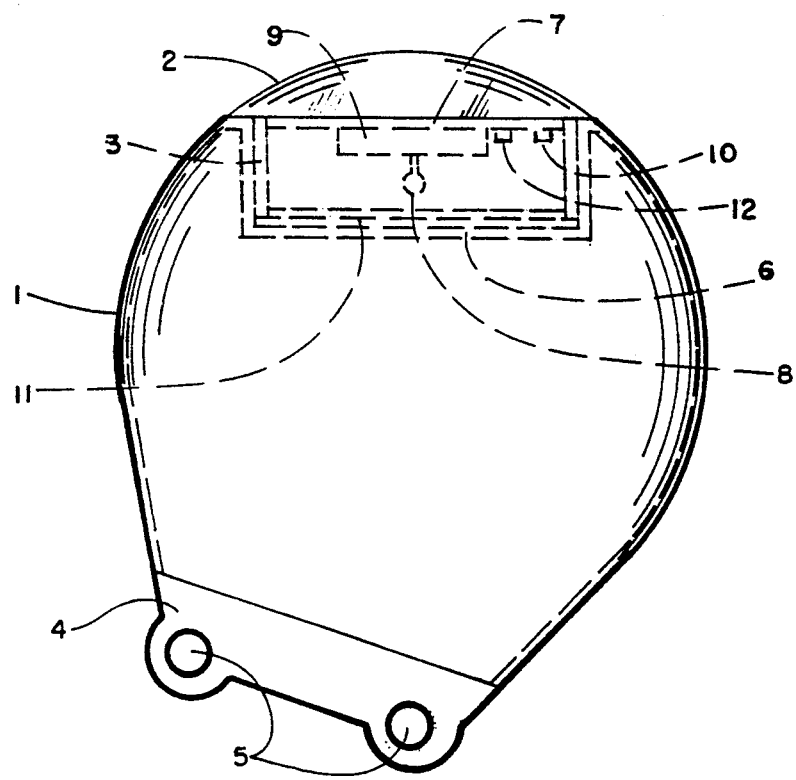
FIG. 4 is a front view of a second embodiment of the present invention.

FIG. 4 shows a second embodiment of the present invention which is substantially similar in construction to the first embodiment described with reference to FIGS. 1 and 2 except that an extra fastening hole 5 is attached to the float main body.

According to the second embodiment with the above described construction, the electrical energy is automatically generated and stored in the day-time and the light is automatically emitted during the night.

Figure 5:
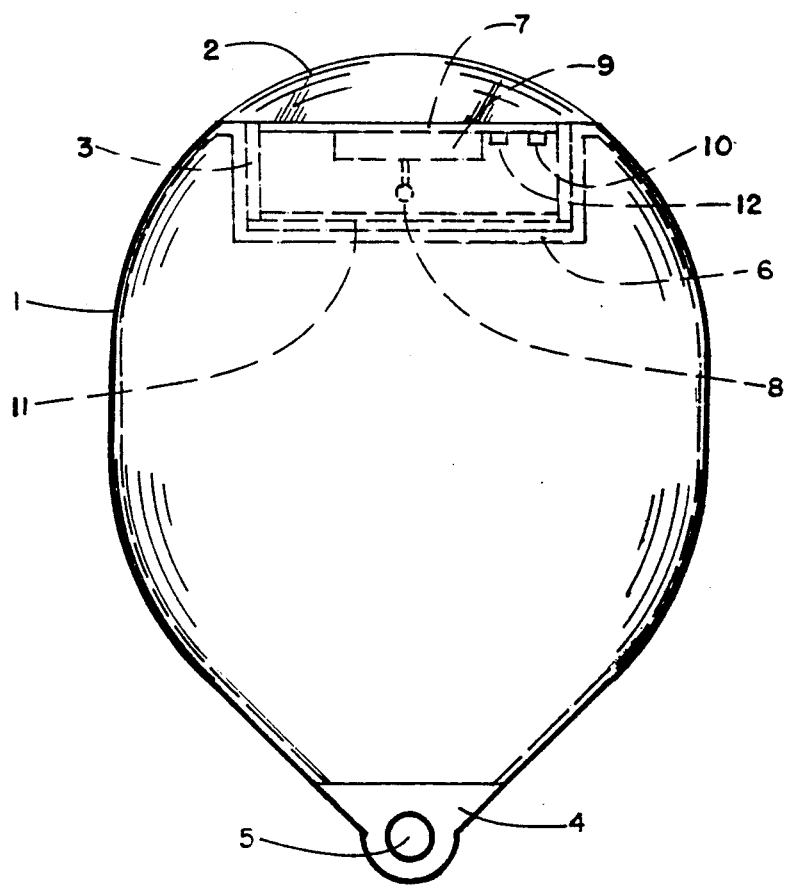
FIG. 5 is a front view of the third embodiment of the present invention.

FIG. 5 shows a third embodiment of the present invention which is substantially similar in construction to the first embodiment described above except that a more elongated cylindrical float main body 1 is used.

According to the third embodiment with the above described construction, because of the solar-energy collection ability of the solar-lens 2, the electrical energy generated by each solar module 7 is increased and furthermore the light emitted from the light-emitting element 8 radiating outward through the translucent float main body 1 will increase visibility at night. In addition, because of the provision of the more elongated cylindrical float main body 1 being used the visual perceptivity can be used during the day-time and night.

In addition to the shapes of the illuminated floats described above, they may be in any desired form of a buoyant float body. It is to be under stood that the present invention is not limited to the embodiments described above and that various modifications can be effected as needs demand.

What is claimed is:

1. An illuminated float comprising:
   a. a buoyant float main body;
   b. a removable solar insert, positioned in said float main body;
   c. a solar generator positioned in said solar insert for generating electricity when exposed to light;
   d. a solar lens, positioned in said solar insert, for protecting the solar generator and collecting and refracting light onto said solar generator thereby causing a greater amount of electricity to be generated;
   e. a battery, within said solar insert, for storing electrical energy generated by said solar generator;
   f. a light-emitting element, within said solar insert, energized from said battery, for emitting light and thereby making said float main body illuminated, radiating outward through the float main body;
   g. a homing device, within said solar insert, for emitting a beacon to be displayed on a display screen to further increase recoverability in even the most extreme conditions;
   h. means, within said solar insert, for providing electrical energy from said battery to said light-emitting element upon ambient light reaching a predetermined low level, and means, within said solar insert, for providing electrical energy from said battery to said homing device also when the predetermined level of ambient light is reached.

2. The float defined in claim 1, in which said solar insert has an interior cavity sized for reception of said solar generator, said light-emitting element, said battery, said homing device, and said means, within said solar insert for providing electrical energy from said battery to said light-emitting element and said homing device.

3. The float as described in claim 1, in which said solar insert is securely sealed, even when completely detached from said float main body.

4. The float as described in claim 3, in which said solar insert contains all means necessary to illuminate said float main body.

5. An illuminated float comprising:
   a. a buoyant float main body adapted to float in water;
   b. a fastening hole, positioned in said float main body, there through to slidably receive a flexible line so that the float main body can rotate about the perimeter defined by said line in response to wave motion on the water;
   c. a removable solar insert, positioned in said float main body, containing means for illuminating said float main body;
   d. a solar generator positioned in said solar insert for generating electricity when exposed to light;
   e. a battery, within said solar insert, for storing electrical energy generated by said solar generator;
   f. a light-emitting element, within said solar insert, for emitting light in response to electrical energy furnished by said battery;
   g. means, within said solar insert, for providing electrical energy from said battery to said light emitting element upon a predetermined low level of light.

6. The float defined in claim 5, in which said solar insert has an interior cavity sized for reception of said solar generator, said light-emitting element, said battery, and said means within said solar insert for providing electrical energy from said battery to said light-emitting element.

7. The float as described in claim 5, in which said solar insert is securely sealed, even when completely detached from said float main body.

8. The float described in claim 7, in which said solar insert is positioned in said float main body and is located exactly opposite from said fastening hole in order to stabilize and maintain said solar insert in an upright direction, toward the light.

9. An illuminated float comprising:
   a. a buoyant float main body;
   b. a removable solar insert, containing a solar generator, positioned in said float main body;
   c. a fastening hole, positioned in said float main body to slidably receive a line so that said float main body can rotate about the perimeter defined by said line in response to wave motion on the water.

10. The float as described in claim 9, in which said solar insert is securely sealed, even when completely detached from said float main body.

11. The float as described in claim 10, in which said solar insert contains all means necessary to illuminate said float main body.

12. The float described in claim 11, in which said solar insert is positioned in said float main body and is located exactly opposite from said fastening hole in order to maintain said solar insert in an upright direction, toward the light.

* * * * *